Jan. 28, 1947.  W. L. BARROW  2,414,791
INSTRUMENT LANDING SYSTEM
Filed Oct. 23, 1941  5 Sheets-Sheet 1

INVENTOR
WILMER L. BARROW
BY
Herbert H. Thompson
ATTORNEY

UNITED STATES PATENT OFFICE 2,414,791

INSTRUMENT LANDING SYSTEM

Wilmer L. Barrow, Newton, Mass., assignor to Sperry Gyroscope Company, Inc., Brooklyn, N. Y., a corporation of New York Application October 23, 1941, Serial No. 416,160

11 Claims. (Cl. 250—11)

This invention relates, generally, to the blind landing of aircraft by radio means, and the invention has reference, more particularly, to a novel overlapping beam type of instrument landing system in which the signal transmitted from the ground or other landing area and received at the aircraft is designed to provide in the craft suitable control voltages or currents such as an audio frequency voltage or current of reversing phase character. Such a signal is suitable for use in a servo-controlling device which controls the landing of the aircraft and in actuating indicating instruments useful as aids in landing aircraft.

In the overlapping-beam instrument landing systems of the prior art, two or more beams are transmitted to provide an equi-signal course along which the plane should fly in order, safely and properly, to carry out an instrument landing. In these prior art systems, it has been customary to modulate each of the two or more beams at distinct and different audio frequencies; for example, 90 and 150 cycles, etc., a second. Further characteristics of these prior-art systems include separation of filter circuits in the receiver that separate into distinct circuits the received signal from each of the two or more beams, and indicating devices that operate by virtue of the difference of intensity of the signals thus separated. It is also customary, in most of the prior art systems, alternately to transmit on one beam and then the other, in order to avoid effects of interference in space by the two beams of the same carrier frequency. This commutation of the carrier necessitates the use of more or less complicated equipment and in addition generally lowers the operating efficiency of the systems employing the same. Further, these prior art systems generally were not readily adaptable for automatic control of the aircraft.

One object of the present invention is to provide a novel overlapping beam type of instrument landing system employing ultra high frequency transmitter means feeding directive radiators to transmit simultaneously a plurality of overlapping beams, one or more pairs of which beams are used for directing the craft in one or more planes, and at least one of which beams is used to provide a reference signal.

Another object of the invention is to provide a receiver on the craft adapted for receiving said beams and utilizing the same for establishing the degree of deviation of the craft from its true course in any desired plane or planes, said receiver producing a variable magnitude, reversible phase signal suitable for control purposes.

Still another object of the invention is to provide means for utilizing the output of said receiver for controlling servo means effecting automatic control of the craft.

Another object of the present invention is to provide a novel beam type of instrument landing system of the above character wherein the ultra high frequency transmitter means employs an audio frequency or servo-signal modulation superimposed on a radio frequency modulation to make possible a separate reception of the indicating or servo-signal from the reference signal, which has the same audio frequency and must be transmitted independently on the craft to provide the necessary phase reference required by said indicating or servo-signal electrically controlled equipment. said reference signal modulation being superimposed on a different radio frequency modulation from the servo-signal, thus providing distinct channels which may be filtered in the receiver means and independently demodulated.

Another object of the present invention is to provide a novel beam type of instrument landing system of the above character wherein, for guidance in a single spacial coordinate, an oscillator means applies an ultra high frequency to a radio frequency modulated power amplifier means, the output of which is fed to two frequency multiplier means which are in turn preferably modulated in phase opposition by a servo frequency, the resultant outputs being applied to two directive radiators to form overlapping guide beams, while concomitantly the reference beam is produced in a similar manner but modulated by a different radio frequency and by the same servo frequency in fixed phase relation to said aforementioned servo frequencies.

Still another object of the invention is to provide signal modulation means consisting of turnable baffles or vanes insertable in the path of the electromagnetic radiation, as in a wave guide or radiator.

Another object of the present invention is to provide a novel beam type of instrument landing system of the above character wherein, for guidance in both coordinates, an oscillator means applies an ultra high frequency to a power amplifier, the output of which is fed to three high frequency multiplier means, each multiplier being modulated by a separate radio frequency, resulting in three separate frequency channels feeding individual wave guides, two of which guides are divided into two sections each, the amplitude of said frequency channels being caused to be modulated by paddles or vanes, situated in said four divided guide sections and in one undivided wave guide, as said paddles are rotated or turned on a common axis by a motor.

Still another object of the present invention is to provide a novel beam type of instrument landing system of the above character wherein, for obtaining guidance in both coordinates, commutation is employed to feed, in proper sequence, the necessary radio frequency and servo frequency modulations to an ultra high frequency amplifier means, the output of which is applied to an antenna or other radiator supplying a turnable parabolic reflector or other directive means, whose axis of symmetry is slightly tilted with respect to its turning axis, said reflector turning synchronously with said commutation, thus producing in succession the necessary guide beams properly orientated in space, while concomitantly the reference beam is separately radiated.

Other objects and advantages will become apparent from the specification, taken in connection with the accompanying drawings, wherein the invention is embodied in concrete form.

In the drawings,

Figs. 7, 8 and 9 show vector relations from which Fig. 6 is derived.

Figures 1, 3, 4, 5:
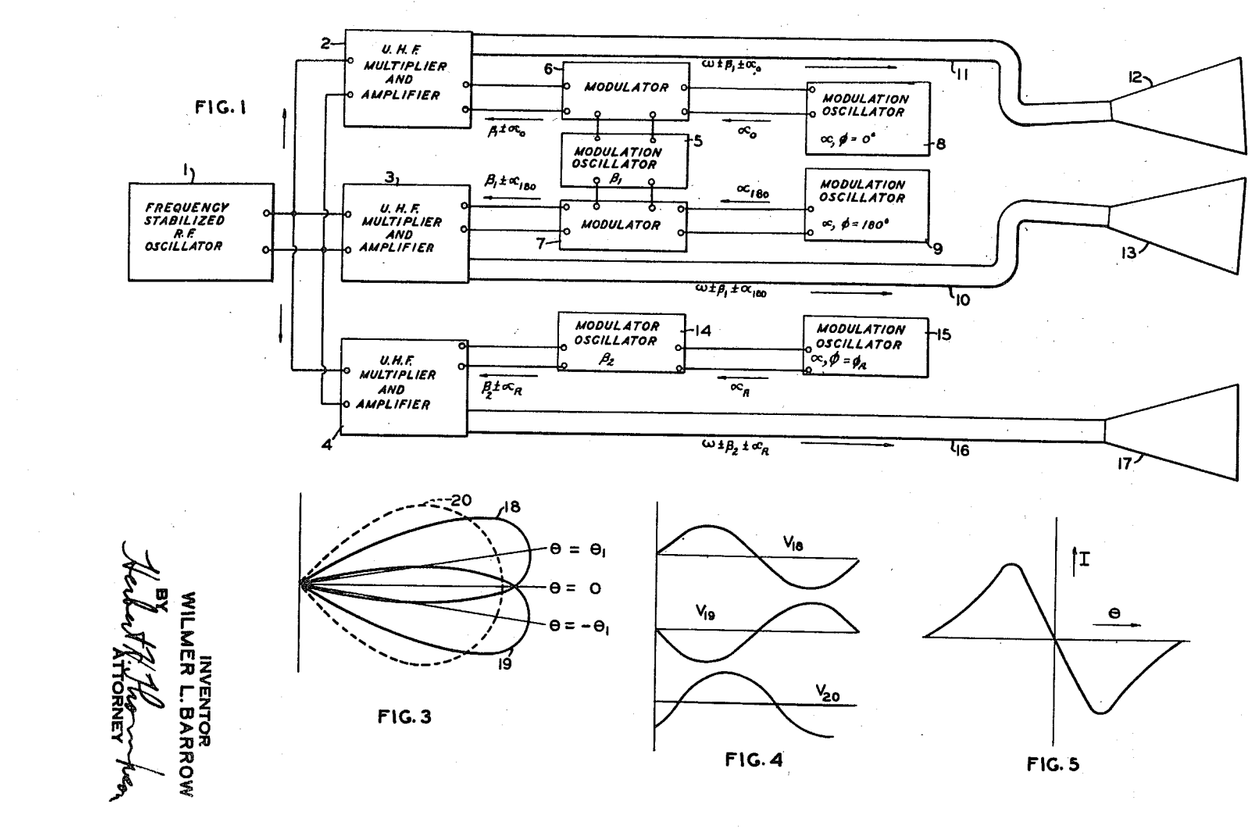
Fig. 1 is a block diagram of a transmitter of this invention suitable for producing the desired beams in either azimuth or elevation.
Fig. 3 shows the plan view of the three beams required for control in any one coordinate.
Fig. 4 shows the character of the modulation applied to these three beams.
Fig. 5 shows the variation of the final direct current output of the receiver used in controlling the servo-system as a function of the angular deviation of the aircraft from the fixed flight path.

Referring now to Fig. 1, a block or functional diagram is illustrated of the instrument landing system as pertains to one coordinate or plane. The transmitting source 1 is a frequency stabilized radio-frequency oscillator of conventional type, whose frequency, after multiplication by the ultra high frequency multiplier amplifiers 2, 3 or 4, becomes a frequency which is of the order of $3 \times 10^9$ cycles per second and which may be designated as $\omega$ and is useful in this invention because of the well known properties of such ultra high frequency. The output of a modulation oscillator 5, preferably of radio frequency is modulated by the output of a lower frequency oscillator 8 and the resultant modulation products are used to modulate the carrier frequency of device 2. Thus, for example, the frequency $\omega$ emitted by multiplier amplifiers 2 and 3 may be modulated by a frequency $\beta_1$ (of the order of, say 300 kilocycles), $\pm$ another frequency $\alpha$ (of the order of, say 60 cycles). The modulation $\alpha$ applied from oscillator 8 has $\phi = 0°$, where $\phi$ is the phase; this signal, combined with $\beta_1$ in modulator 6 is referred to as $\beta_1 \pm \alpha_0$. The useful side bands supplied by multiplier 2 are then $\omega \pm \beta_1 \pm \alpha_0$. The modulation $\alpha$ applied from oscillator 9 has $\phi = 180°$; this signal, combined with $\beta_1$ in modulator 7 is referred to as $B_1 \pm \alpha_{180}$. The useful side bands emitted by multiplier 3 are then $\omega \pm \beta_1 \pm \alpha_{180}$.

The frequency $\omega$ emitted by multiplier amplifier 4 is modulated by a frequency $\beta_2$ (of the order of, say 100 kilocycles), $\pm$ the $\alpha$ frequency. The modulation $\alpha$ applied from oscillator 15 has $\phi = \phi_R$ which may have any fixed phase relation to the outputs of oscillators 8 and 9; this signal, combined with $\beta_2$ in modulator oscillator 14 is referred to as $\beta_2 \pm \alpha_R$. The doubly modulated carrier emitted by multiplier 4 is then $\omega \pm \beta_2 \pm \alpha_R$.

The three signal channels, $\omega \pm \beta_1 \pm \alpha_0$, $\omega \pm \beta_1 \pm \alpha_{180}$, and $\omega \pm \beta_2 \pm \alpha_R$ are fed through wave guides 11, 10 and 16, to radiators 12, 13, and 17, respectively. These radiators are shown as horns but may be any of the well known types of directive radiators. The radiators 12 and 13 are so orientated relative to each other that the characteristic overlapping-beam radiation pattern consisting of beams 18 and 19 (see Fig. 3) is produced, whereas radiator 17 produces a wide beam 20 containing both beams 18 and 19. These beams are transmitted continuously, and the lower frequency $\alpha$ of modulation of the three beams is the same. The phase of the three modulations is such that when the envelope of one beam has its maximum, that of the second preferably has its minimum, while the envelope of the third or reference beam, whose phase is the reference, may be similar to one of the above or at an intermediate value.

Two distinct pairs of overlapping beams 18, 19 and 18', 19' (see Fig. 6) are employed as follows: one pair 18', 19' displaced angularly from each other in a vertical plane intersect along an inclined line producing the desired flight path to give altitude or glide path information to the craft; and the other pair 18, 19 displaced angularly from each other in a transverse plane, also intersect along said inclined line to give lateral or runway localizer information to the craft. These two sets of beams together provide continuous indication of the relative position of the plane with respect to the reference landing path in space that intersects the runway at its leading or approach edge.

Figures 6, 10:
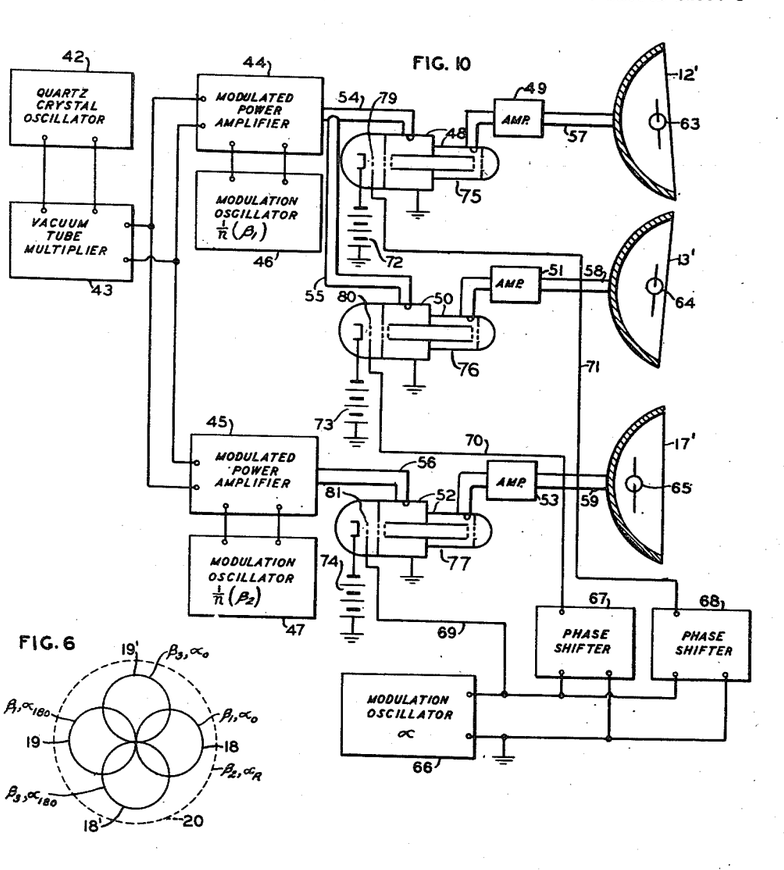
Fig. 6 shows a cross section of the five beams needed for control in both coordinates.
Fig. 10 shows an alternate transmitter system which affords control in one coordinate.

Thus, two of the systems shown in Fig. 1 would be necessary for the complete system described above. A cross-section of the five beams necessary being shown in Fig. 6. The beams have the following frequencies:

Right-left $\begin{cases} \omega \pm \beta_1 \pm \alpha_0 \\ \omega \pm \beta_1 \pm \alpha_{180} \end{cases}$ Up-down $\begin{cases} \omega \pm \beta_3 \pm \alpha_0 \\ \omega \pm \beta_3 \pm \alpha_{180} \end{cases}$ Reference $\omega \pm \beta_2 \pm \alpha_R$ Obviously, the same $\alpha_R$ signal can be used for both coordinates.

Suppose we consider again the right-left signal generation system as shown in Fig. 1. If, for example, the radiators 12 and 13 are to supply this right-left signal, then Fig. 3 shows the horizontal patterns of the radiation fields, curve 18 indicating the pattern from radiator 12, curve 19, that from radiator 13, and curve 20, that from radiator 17.

According to the above description, antennas 12 and 13 transmit overlapping beams in which the indicating or servo-signal modulation $\alpha_0$, $\alpha_{180}$ is superimposed on the relatively high frequency modulation of frequency $\beta_1$ from modulator 5. The purpose of the modulation oscillator 5 is to make possible a separate reception of the servo-signal, i. e., the vector sum of $\alpha_0$ and $\alpha_{180}$ which may be designated as $\alpha_P$, of the overlapping beams 18 and 19 from the reference signal $\alpha_R$ of beam 20, which has the same frequency as the servo-signal and which must be transmited to the craft also. In the functional diagram shown in Fig. 1, the separate transmission of the servo and reference signals is provided by means of the two distinct double modulations of frequencies $\beta_1$ and $\beta_2$. Appropriate equipment, to be described, in the receiver separates $\beta_1$ and its servo signal modulations from $\beta_2$ and its reference signal modulations.

Fig. 4 illustrates the relation of $\alpha$ modulating voltages of the outputs of antennas 12, 13, and 17, respectively; the upper diagram showing the phase of the modulation on beam 18, the middle diagram, the $\alpha$ modulation of beam 19; this being of opposite phase; and the lowest diagram showing the phase of the reference modulation on beam 20.

The operation of servo-signal electrically controlled equipment of this invention requires the use of the aforesaid servo voltage and the steady reference voltage of identical frequency. The reference voltage is to be continuously supplied to servo apparatus of a balanced rectifier or similar type in order to provide a direct current output whose amplitude and polarity vary with the magnitude and phase, respectively, of the servo signal $\alpha_P$. The pattern 20, representing the reference beam is preferably made broad to supply said reference voltage at all positions of the craft in space at which the servo-signal may be received. Frequencies $\beta_1$ and $\beta_2$ are chosen to make modulation simple and to make easy the separation of servo and reference signals in the receiver, as determined by the details of the equipment employed and the state of the art.

Figure 2:
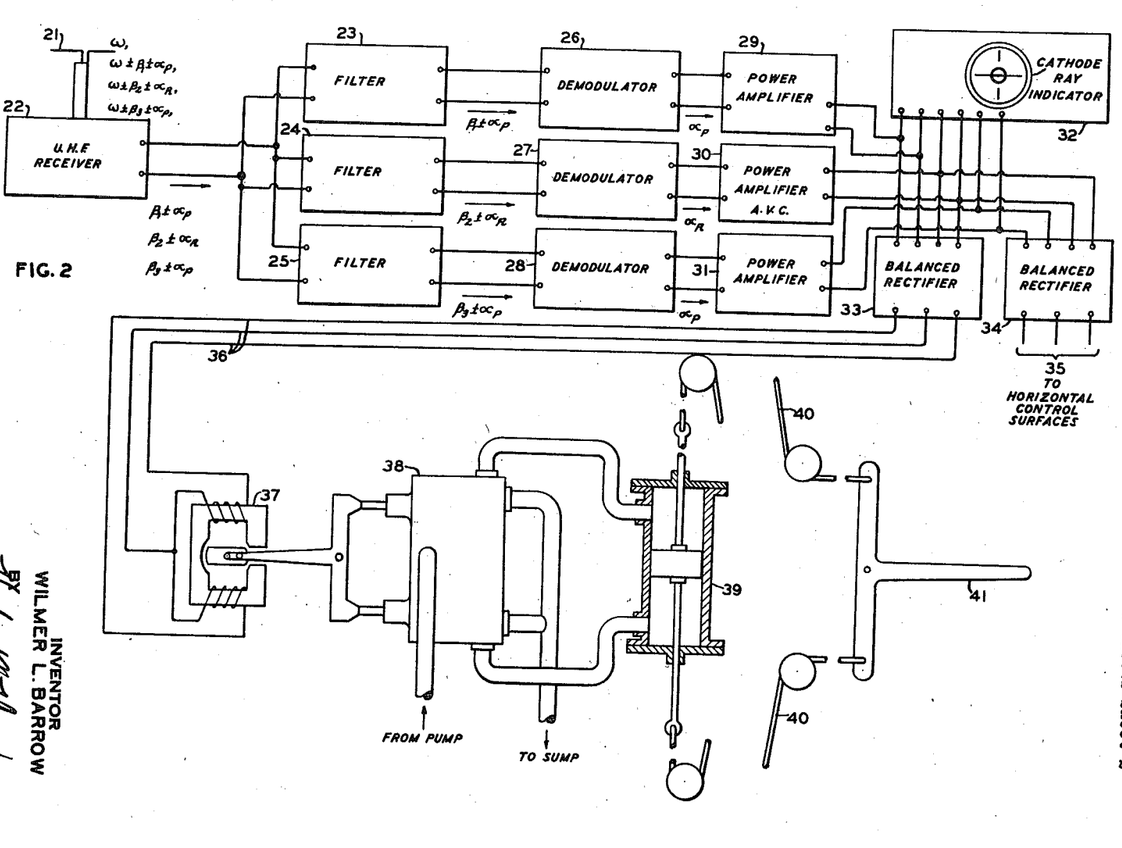
Fig. 2 is a diagram of a receiver suitable for changing right-left and/or up-down information, as received from two transmitting systems such as the one shown in Fig. 1, into servo signals for operation of the control surfaces of the aircraft by means of a conventional servo-system and/or for operation of indicating instruments.

Fig. 2 illustrates practical receiver equipment for this blind landing system. The energy received, contains the following frequencies, for a five beam system, i. e., $\omega, \omega \pm \beta_1 \pm \alpha_P$, $\omega \pm \beta_2 \pm \alpha_R$, $\omega \pm \beta_3 \pm \alpha_P$, where we denoted $\alpha_0$, $\alpha_{180}$ by $\alpha_P$, and is picked up by antenna 21, then amplified and demodulated by ultra high frequency receiver 22. The output of receiver 22 consists of $\beta_1 \pm \alpha_P, \beta_2 \pm \alpha_R$, $\beta_3 \pm \alpha_P$ resulting from the above-described modulation processes. The output of the receiver 22 is separated into three different circuits by means of the separation filters 23, 24 and 25. Filter 23 selects $\beta_1 \pm \alpha_P$ and rejects all other signals. The second separation filter 24 passes $\beta_2 \pm \alpha_R$. The third filter 25 passes signals of $\beta_3 \pm \alpha_P$. The three filters are followed by demodulators 26, 27 and 28 whose output will contain currents of frequency $\alpha$ only.

The outputs of the demodulators 26, 27 and 28 are amplified by means of power amplifiers 29, 30, and 31, respectively. A cathode ray indicator 32 of the type disclosed in applications Serial No. 101,274, filed September 17, 1936, by F. Moseley, for Aircraft flight indicator and control system therefor, and Serial No. 378,030, filed February 8, 1941, by E. Norden, F. Gemmill and E. Isbister for Aircraft flight indicator and system, is connected to the outputs of the above amplifiers. A balanced rectifier 33 is supplied with $\alpha_P$ by amplifier 29 and $\alpha_P$ by amplifier 30. The varying direct current signal from 33 travels through leads 36 to operate a motor 37. The motor 37 actuates a conventional hydraulic servo system consisting of a sensitive valve 38, a power cylinder 39, and transmission cables 40 to control a vertical rudder surface 41. Another balanced rectifier 34 is supplied with $\alpha_P$ and $\alpha_R$ by amplifiers 31 and 30, respectively. The leads 35 from this rectifier 34 may be used to operate a similar servo system to turn the horizontal control surfaces of the craft.

Figure 15:
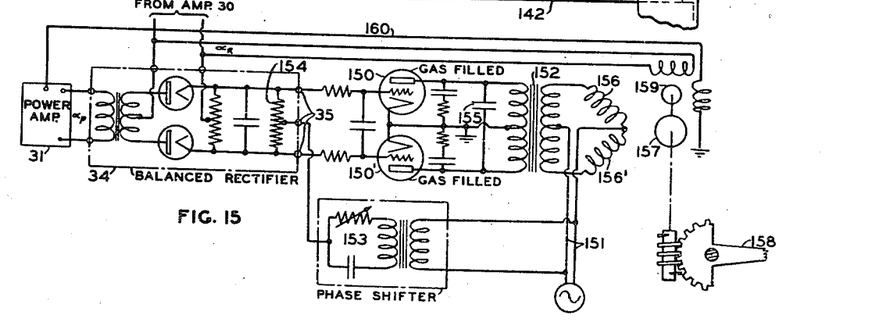
Fig. 15 illustrates an electric servo device adapted for use in connection with the structure of Fig. 2.

If desired, instead of using a hydraulic servo system for operating the rudder 41 or elevator, as the case may be, the same may be operated by an electric servo system as shown in Fig. 15. In this system the balanced rectifier 34 is connected through the two outer leads 35 to the grids of grid controlled rectifier tubes 150 and 150'. A local alternating current supply 151 feeds a voltage through transformer 152 to the plates of tubes 150 and 150' in phase opposition, while this supply acts through a network 153, central lead 35, a divided resistor 154, and by way of the outer leads 35 to apply a phase shifted bias voltage to the grids of the tubes 150 and 150'. This bias voltage is displaced approximately 180° with respect to the alternating current plate voltage.

When the output signal $\alpha_P$ is of one phase corresponding to the location of the craft in the lower lobe 18' of Fig. 6, for example, then this signal will put a positive voltage on the grid of, say, tube 150 at the same time that its plate swings positive. This causes tube 150 to conduct, thereby shorting the upper half of transformer 152, in effect, so that the lower half of this transformer is placed in parallel with a condenser 155. The presence of this condenser is reflected in the lower half of the secondary of transformer 152 as a large capacity having the effect of producing a substantially 90° leading current in the lower half of the secondary and in the connected winding 156' of a split phase induction motor 157, whose other winding 156, at this time, is supplied with current in phase with the supply 151. Thus the motor 157 operates in one direction to actuate control surface 158 in the proper manner to effect an upward movement of the craft toward the intersection of beams 18' and 19'.

If the craft were in beam 19', the lower tube 150' would be caused to pass current thus effecting rotation of the motor 157 in the reverse direction as will be apparent. The greater the magnitude of the signal voltage, the greater the resultant motor speed will be, so that the motor speed and hence the rate of movement of the craft back to the desired glide path is substantially proportional to its deviation from this path. In order to prevent hunting of the craft about the desired glide path, an anti-hunt circuit may be used employing a generator 159 driven by motor 157 and supplying a velocity voltage through a lead 160 to the input of power amplifier 31 in opposition to the signal voltage $\alpha_P$.

The output of the demodulator 26 provides the servo voltage whose frequency is $\alpha_P$ and whose phase is either 0° or 180° depending on which side of the true glide path the craft is located, and whose amplitude will vary with the right-left position in space of the receiving equipment. The amplitude will increase with the angular deviation from the equi-signal path for signals up to a certain value, after which it will gradually reduce to zero for continued deviation. The output of the demodulator 27 comprises the reference voltage of frequency $\alpha_R$, of constant reference phase and substantially constant amplitude as provided by appropriate volume controls or by automatic volume control. The output of the demodulator 28 provides the servo voltage whose frequency is again $\alpha_P$, whose phase is either 0° or 180°, and whose amplitude will vary with the up-down position in space of the receiver.

Figure 7:
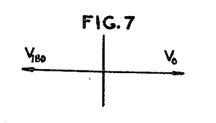
Figure 8:
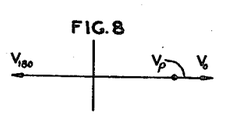
Figure 9:
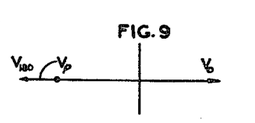

Consideration of the system as described above should make it appear that the demodulated output from demodulators 26 and 28 will have a zero value, both as to amplitude and phase, when the aircraft is disposed along the equi-signal path, indicated in Fig. 3 for one coordinate by $\theta=0$. When the receiving apparatus is at a position indicated in Fig. 3 by $\theta=\theta_1$, the strength of signal from beam 18 is greater than that of beam 19. Consequently, there will be an alternating current output from demodulator 26 whose phase is 0° and whose amplitude, over a relatively broad angular range, will be roughly proportional to the angle $\theta$. Similarly, when the receiving equipment is placed in the angular positions $\theta=-\theta_1$ of Fig. 3, the signal received from beam 19 will predominate over that of beam 18; the output of demodulator 26 will then comprise an alternating current of 180° phase and of amplitude also roughly proportional to the angular deviation $-\theta$. Figs. 7, 8 and 9 indicate, by means of rotating vector diagrams, the three situations just described, wherein $V_P$ indicates the output voltage of demodulator 26.

As above described, two pairs of beams will be needed in a complete instrument landing system; one pair for the localizer and one pair for the glide path. Generally the transmitting equipment for these two functions are located at the opposite ends of the runway, although they may be located at the same place. It will, therefore, generally be necessary to have two complete sets of transmitting apparatus, and their carrier frequencies may or may not be the same. Thus, two complete sets of receiving equipment on the craft may be necessary, one of which is tuned to the localizer transmitter and the other to the glide-path transmitter. To make one of the receivers required for a two separate receiver system, the channel consisting of filter 25, demodulator 28, and power amplifier 31 would be omitted from the receiver of Fig. 2.

Inasmuch as a two coordinate system requires a minimum of three signal channels, only two $\beta$ modulations, for example, $\beta_2$ and $\beta_3$, are necessary to separate these channels at the receiver. In this case one channel will be in the form $\omega \pm \alpha_P$, so that filter 23 would pass $\alpha_P$, rejecting all other frequencies, and demodulator 26 would be eliminated. In general, if $n$ is the number of channels employed, the minimum number of $\beta$ modulations necessary is $(n-1)$.

Fig. 5 shows a diagram of the variation of the direct current output of the balanced rectifiers 33 and 34, as a measure of the angular deviation of the plane from its proper course. When on course, there is zero current a negative angular deviation causes an increase in the plus sense, and a positive angular deviation an increase in the negative sense of the current. Over a reasonable range the change in current is roughly proportional to the angular deviation. Such direct current characteristics are admirably suited to cathode ray or meter indication or to the operation of electrical machinery, hydraulic machinery through electro-hydraulic interconnections, and to combination with other signals or take-off currents in the craft.

Fig. 10 illustrates in detail a transmitter suitable for use in one coordinate. A quartz crystal oscillator 42 supplies a stabilized frequency to a vacuum tube multiplier 43. The output of multiplier 43 supplies two modulated power amplifiers 44 and 45. Amplifiers 44 and 45 are modulated by modulation oscillators 46 and 47 with frequencies $$\frac{1}{n}(\beta_1) \quad \text{and} \quad \frac{1}{n}(\beta_2)$$

The output of the modulated power amplifier 44 with a frequency $$\frac{1}{n}(\omega \pm \beta_1)$$

is fed by coaxial leads 54 and 55 to multipliers 75 and 76 of the type disclosed in copending application, Serial No. 416,170, for Ultra high frequency electron discharge tubes, filed October 23, 1941. The outputs of tubes 75 and 76 are further modulated by the relative low $\alpha$ frequency which is supplied from modulation oscillator 66 through phase shifters 67 and 68 and leads 70 and 71 to modulating grids 80 and 79 of tubes 76 and 75 in 180° out-of-phase relation. The doubly modulated outputs of tubes 75 and 76 after amplification by amplifiers 49 and 51 are supplied through lines 57 and 58 to the radiators 63 and 64 whose reflectors 12' and 13' produce the desired overlapping beams as shown in Figs. 3 and 6. The output of amplifier 45 as modulated by $$\frac{1}{n}(\beta_2)$$

is applied to a frequency multiplier 77 which is supplied with the $\alpha_R$ modulation by means of leads 69 and modulating grid 81 whereby the output of this tube, as modulated by $$\frac{1}{n}(\beta_2)$$

and $\alpha_R$, after amplification by amplifier 53 is supplied through line 59 to radiator 65 having a reflector 11' producing the reference beam 20. Batteries 72, 73 and 74 provide the accelerating voltages for tubes 75, 76 and 77.

Figures 11, 12:
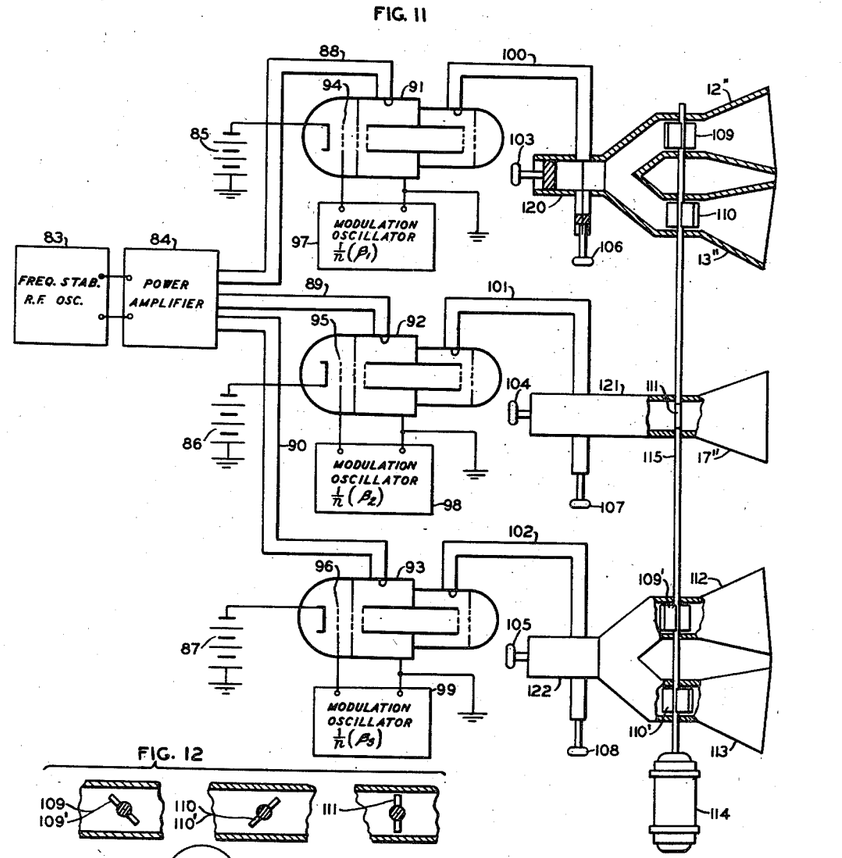
Fig. 11 shows a transmitter system which affords control in both coordinates.
Fig. 12 shows a detail of a modulating device used in the radiating horns of Fig. 11.

Fig. 11 illustrates another transmitter arrangement for producing the necessary beams for both coordinates. A frequency stabilized radio frequency oscillator 83 and a power amplifier 84 supply a frequency $$\frac{1}{n}(\omega)$$

through coaxial lines 88, 89 and 90 to frequency multipliers 91, 92, 93, respectively. The multiplier 91 is modulated by a frequency $$\frac{1}{n}(\beta_1)$$

supplied by an oscillator 97 to grid 94, the multiplier 92 by $$\frac{1}{n}(\beta_2)$$

supplied by an oscillator 98 to a grid 95, and the multiplier 93 by $$\frac{1}{n}(\beta_3)$$

supplied by an oscillator 99 to a grid 96. Multipliers 91, 92, 93 then feed $\omega \pm \beta_1$, $\omega \pm \beta_2$, $\omega \pm \beta_3$ through concentric lines 100, 101, 102, to wave guide portions 120, 121, 122, respectively. Wave guide portions 120, 121, 122 are shown as having matching plugs 103, 104, 105, respectively, and coaxial lines 100, 101, 102 may have matching plugs 106, 107, 108, respectively. Wave guide portion 120 divides into two sections, feeding horns (or other radiators) 12" and 13". Similarly, wave guide portion 122 divides into two sections, feeding radiators 112 and 113. Wave guide 121 connects with radiator 17". Mounted in the divided sections of the wave guides 120 and 122 and in the undivided wave guide 121 are paddles 109, 110, 109', 110', and 111, respectively, on a common shaft 115 which is turned by a motor 114 at $\alpha$ revolutions a second. These paddles or baffles alternately open and close their associated wave guides, thus modulating the flow of radiation with a periodicity equal to the speed of rotation or oscillation of the paddles. Fig. 12 shows the orientation of these paddles relative to shaft 115, to which they are all attached, this fixed orientation thus producing a fixed time relationship between the motion of the paddles and the time of superposition of the different $\alpha$ modulations so that, for illustration, at the moment that the ultra high frequency wave passing through horn 12" is at full amplitude the ultra high frequency wave passing through horn 13" is at its minimum amplitude. Paddles 109 and 109' in wave guide sections leading to radiators 12" and 112, respectively, produce $\alpha_0$ modulation. Paddles 110 and 110' in wave guide sections leading to radiators 13" and 113, respectively, cause an $\alpha_{180}$ modulation. Paddle 111 in the wave guide 121 gives the radiation from radiator 17" and $\alpha_R$ modulation. The output of horns 12" and 13" is then $\omega \pm \beta_1 \pm \alpha_0$ and $\omega \pm \beta_1 \pm \alpha_{180}$, respectively. These two beams may be used for right-left indication. The radiation from horns 112 and 113 is $\omega \pm \beta_3 \pm \alpha_0$ and $\omega \pm \beta_3 \pm \alpha_{180}$. This channel may be used for up-down indication in the aircraft. Radiator 17" emits a reference channel $\omega \pm \beta_2 \pm \alpha_R$.

Figure 13:
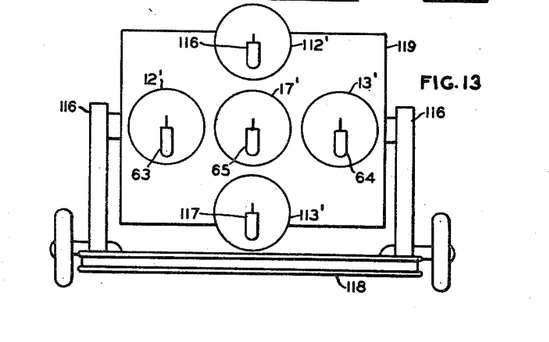
Fig. 13 shows an elevation of parabolas and their relative orientation, as used in a transmitting system such as that of Fig. 10.

Fig. 13 shows a typical arrangement of the radiators 112', 113', 12', 13' and 17' associated with the complete system of Fig. 10, the radiators 112' and 113' being used for producing the elevational lobes.

The radiators may be mounted in a frame 119 mounted on trunnions turnably supported on posts 116, carried by a movable truck 118. A similar arrangement may be used in connection with the structure of Figs. 1 and 11. The radiation from these parabolas or horns is as follows:

| | |
|---|---|
| 12' | $\omega \pm \beta_1 \pm \alpha_0$ |
| 13' | $\omega \pm \beta_1 \pm \alpha_{180}$ |
| 112' | $\omega \pm \beta_3 \pm \alpha_0$ |
| 113' | $\omega \pm \beta_3 \pm \alpha_{180}$ |
| 17 | $\omega \pm \beta_2 \pm \alpha_R$ |

Figure 14:
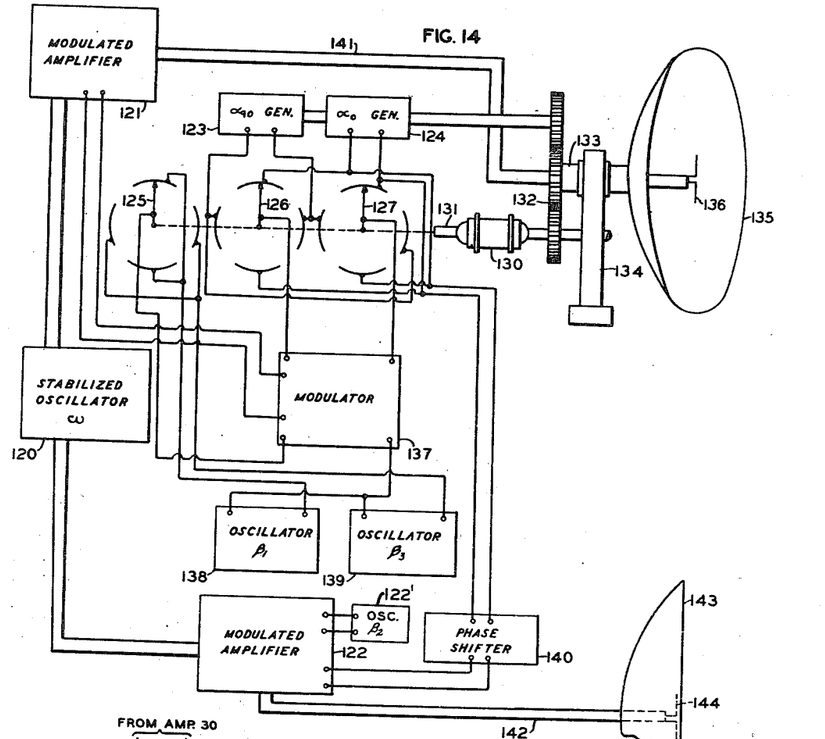
Fig. 14 shows an alternate commutated system using a single rotating offset parabola to provide the four overlapping beams necessary.

Fig. 14 represents a two coordinate system using commutation to feed, in proper sequence, $\alpha_0$, $\alpha_{90}$, $\alpha_{180}$, $\alpha_{270}$, $\beta_1$, and $\beta_3$ to a modulator 137. A stabilized oscillator 120 supplies a carrier $\omega$ to modulated amplifiers 121 and 122. The modulated amplifier 121 feeds through a concentric line 141 to an antenna 136 which is mounted stationary in a parabolic reflector 135, the focus of which is slightly displaced with respect to the antenna 136 itself. A motor 130, through gearing 132 and a hollow shaft 133 rotates the parabola 135, thereby rotating the focus of this reflector around the antenna 136 in such a manner that the principle axis of the beam describes a cone and the intensity on the axis of rotation is not zero at any position, as well as operating an $\alpha_{90}$ generator 123, an $\alpha_0$ generator 124, and the contact arms of four-segment commutators 125, 126, 127.

One output of the $\alpha_{90}$ generator is connected to the left and right segments of commutators 126 and 127, respectively, while the other output terminal is led to the right and left contacts of 126 and 127, respectively. One side of the output of the $\alpha_0$ generator goes to the upper and lower segments of commutators 126 and 127, respectively, while the other side of the $\alpha_0$ generator's output is applied to the lower and upper portions of 126 and 127, respectively. The $\alpha_0$ generator also supplies $\alpha_R$ to the modulated amplifier 122 through a phase shifter 140. One terminal of a $\beta_1$ oscillator is connected to the upper and lower contacts of the commutator 125, while one terminal of a $\beta_3$ oscillator feeds the right and left segments of commutator 125. Oscillators 138 and 139 have a common lead with the modulator 137. The modulator 137 is fed appropriate $\alpha$ and $\beta$ frequencies through the brushes of commutators 125, 126, and 127, and supplies the modulation products to the modulated amplifier 121 where a modulation of the carrier $\omega$ takes place. An oscillator 122' supplies a $\beta_2$ frequency to the modulated amplifier 122 whose output is fed through a coaxial line 142 to an antenna 144 in a reflector 143. This radiation is the reference channel $\omega \pm \beta_2 \pm \alpha_R$.

$\alpha_{90}$ could also be obtained from generator 124 and a phase shifter.

When all the contact arms are vertical, the output of antenna 136 is $\omega \pm \beta_1 \pm \alpha_0$. If the parabola rotates in a clockwise direction as one faces the parabola, then when the contact arms all point to the right the antenna output is $\omega \pm \beta_1 \pm \alpha_{180}$. When the contact arms point to the left the parabola output is $\omega \pm \beta_3 \pm \alpha_{270}$. $\alpha_{130}$ and $\alpha_{270}$ exist because the arms 126 and 127 have reversed the connections to generator 123 and 124 as the parabola has rotated through 180°.

Thus, all the necessary guide beams are produced during each revolution of the commutator contact arms, each beam radiating during somewhat less than a quarter cycle of the sweep frequency which may be made any convenient value.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for establishing a flight path comprising means for generating high frequency currents, means for modulating a portion of said currents with a double modulation comprising a separation modulation and a signal modulation, means for modulating another portion of said currents with another double modulation comprising a separation modulation and a signal modulation of the same frequency as said first-mentioned signal modulation but of substantially 180° differing phase position, means for modulating another portion of said high frequency current with a double modulation comprising a separation modulation of a different frequency from said aforementioned separation modulations and a reference frequency of the same frequency as said signal modulations, means for projecting the high frequency currents containing the signal modulations into space in the form of two overlapping lobes of electromagnetic radiation and means for projecting that portion of the high frequency current modulated with the reference modulation into space in the form of a lobe of electromagnetic radiation that overlaps both of said other lobes of electromagnetic radiation, the character of said modulations and the disposition of said lobes being such that said path is a locus of equisignal strength relative to said lobes which define the flight path.

2. Apparatus as defined in claim 1 comprising turnable baffle means positioned within said electromagnetic radiation projecting means for producing said signal and reference modulations.

3. In apparatus of the character described means for generating high frequency energy, a radiator of electromagnetic energy, conduit means for supplying said high frequency energy to said radiator, and movable baffle means positioned for controlling the flow of said high frequency energy through said conduit means and from said radiator for effecting modulation of said energy.

4. Apparatus for defining a flight path axis or the like comprising a source producing a carrier wave of ultra high frequency, means providing a plurality of separate output channels from said source, means for modulating the waves in the respective channels with signals of intermediate frequency, means for further modulating the modulated waves in said channels with signals of relatively lower frequency but differing substantially 180° in phase in the respective channels, and means for directionally radiating the doubly modulated waves from each channel in such manner that said axis is a locus of equisignal strength relative to said waves.

5. In the apparatus defined in claim 4, means providing a third output channel for said carrier wave, means for modulating the carrier wave in said third channel with a signal of a frequency different from said intermediate frequency, means further modulating said modulated carrier wave in the third channel with a signal of said relatively lower frequency but of different phase than the phases in said first two channels.

6. Apparatus for defining the coordinates of a flight path comprising a source producing a carrier wave of ultra high frequency, means providing three separate output channels from said source, means for modulating the carrier waves in each of said channels with signals all of different frequency, and means for further modulating said modulated waves with signals of a still further different frequency, said last named means also embodying means for providing a constant reference phase in the output of one of said channels and related phases in the other two channels, the path defined by said coordinates being of equisignal strength relative to said modulated waves.

7. Apparatus as defined in claim 6, wherein said means for further modulating the modulated waves comprises mechanically actuated baffles located in the different wave guides.

8. In a method of determining direction, the steps of radiating into space at least five overlapping lobes of energy having a selected ultra high frequency, modulating the waves in each of said lobes, further and differently modulating selected pairs of said modulated waves by signals of a relatively lower frequency but substantially 180° apart in phase, directionally radiating all of said lobes in such relation as to establish a selected directional path which is a locus of equisignal strength with respect to all the lobes.

9. Radio apparatus for directing a mobile craft comprising means for radiating partially overlapping radio beams containing a common carrier frequency, means for modulating said beams with a signal in out of phase relationship to establish an equi-signal plane in space, means for radiating a radio wave distinguishable from said overlapping beams, and means for modulating said radio wave with an audio wave synchronized with said signal to provide a phase reference in space serving to determine the direction of departure of said craft from said equi-signal plane.

10. Radio apparatus for directing a mobile craft comprising means for radiating a pair of partially overlapping radio beams having a common carrier frequency, means for modulating said beams with an audio frequency signal substantially in phase opposition to establish an equi-signal plane in space, means for radiating a radio wave receivable independently of said overlapping beams, and means for modulating said radio wave with said audio frequency signal to provide a phase reference in space serving to determine the direction of departure of said craft from said equi-signal plane.

11. Radio apparatus for directing a mobile craft comprising means for radiating a pair of partially overlapping radio beams having a common carrier frequency, means for modulating said beams with an audio frequency signal substantially in phase opposition to establish an equi-signal plane in space, means for independently radiating a separately receivable radio wave modulated by said signal to provide a phase reference in space serving to determine the sense of departure of said craft from said equi-signal plane.

WILMER L. BARROW.

Certificate of Correction

Patent No. 2,414,791. January 28, 1947.

WILMER L. BARROW

It is hereby certified that errors appear in the printed specification of the above numbered patent requiring correction as follows: Column 4, line 18, for "$B_1$" read $\beta_1$; line 32 for "ratdiators" read *radiators*; column 6, line 9, for "$\alpha_P$" after "and" read $\alpha_R$; column 10, line 48, after "output is" insert $\omega \pm \beta_3 \pm \alpha_{90}$ *also when the contact arms point down, the parabola output is;* and that the said Letters Patent should be read with these corrections therein that the same may conform to the record of the case in the Patent Office.

Signed and sealed this 22nd day of July, A. D. 1947.

[SEAL]

LESLIE FRAZER,
*First Assistant Commissioner of Patents.*